US010482301B1

(12) United States Patent
Benkreira et al.

(10) Patent No.: US 10,482,301 B1
(45) Date of Patent: Nov. 19, 2019

(54) SCANNABLE CHECK MANAGEMENT SERVICE

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/182,154

(22) Filed: Nov. 6, 2018

(51) Int. Cl.
*G06K 7/14* (2006.01)
*G06Q 20/32* (2012.01)
*G06Q 20/04* (2012.01)
*H04L 29/06* (2006.01)

(52) U.S. Cl.
CPC ......... *G06K 7/1417* (2013.01); *G06Q 20/042* (2013.01); *G06Q 20/3223* (2013.01); *G06Q 20/3276* (2013.01); *H04L 63/08* (2013.01)

(58) Field of Classification Search
CPC .......... G07F 19/00; G07D 11/60; G07D 11/50
USPC ...... 235/379, 375, 487; 705/35–45; 382/135
See application file for complete search history.

(56) References Cited

U.S. PATENT DOCUMENTS

| 8,231,057 B1* | 7/2012 | Buentello | G06Q 20/042 |
| | | | 235/462.11 |
| 2002/0065771 A1* | 5/2002 | Dutta | G06Q 20/042 |
| | | | 705/40 |
| 2014/0037184 A1* | 2/2014 | Gorski | G06K 9/78 |
| | | | 382/138 |
| 2014/0052621 A1* | 2/2014 | Love | G06Q 20/26 |
| | | | 705/39 |
| 2014/0188726 A1* | 7/2014 | Vasantham | G06Q 20/12 |
| | | | 705/44 |
| 2014/0233837 A1* | 8/2014 | Sandoz | G06F 17/3028 |
| | | | 382/138 |
| 2015/0161765 A1* | 6/2015 | Kota | G06K 9/00442 |
| | | | 382/139 |
| 2018/0276651 A1* | 9/2018 | Gauli | G06Q 20/3274 |

OTHER PUBLICATIONS

E. Tuzemen Atik, A Novelty in Turkish Commercial Life: Execution of QR Code on Cheques, International Journal of Business and Social Research, vol. 07, Issue 12, 2017.

* cited by examiner

*Primary Examiner* — Edwyn Labaze
(74) *Attorney, Agent, or Firm* — DLA Piper LLP US (57) ABSTRACT

A server may receive data identifying a requesting user and data identifying a scanned code from a client device. A processor of the server may analyze the data identifying the scanned code to identify a memo associated with the scanned code. The memo may be associated with a creating user. The processor may determine whether the requesting user is the creating user by analyzing the data identifying the requesting user. In response to determining that the requesting user is the creating user, the processor may permit the client device to access a private account associated with the creating user. In response to determining that the requesting user is not the creating user, the processor may cause the client device to display a message associated with the memo.

13 Claims, 6 Drawing Sheets

SCANNABLE CHECK MANAGEMENT SERVICE

BACKGROUND

Checks typically include space for indicating a recipient who may cash the check, an amount of money to be transferred from an associated checking account upon cashing, a signature, and a memo. The space for entering the memo is typically a single line in a lower-left portion of the check. This is a small space that is capable of holding only a few words of text in most cases. Furthermore, the memo line is visible to anyone inspecting the face of the check, so it is not an appropriate place for private messages from the payor to the payee.

SUMMARY OF THE DISCLOSURE

Disclosed embodiments may utilize checks with scannable codes in place of or in addition to a memo line. For example, a method of providing data access may include receiving, at a server, data identifying a requesting user and data identifying a scanned code from a client device. The method may include analyzing, by a processor of the server, the data identifying the scanned code to identify a memo associated with the scanned code, the memo being associated with a creating user. The method may include determining, by the processor, whether the requesting user is the creating user by analyzing the data identifying the requesting user. The method may include, in response to determining that the requesting user is the creating user, permitting, by the processor, the client device to access a private account associated with the creating user. The method may include, in response to determining that the requesting user is not the creating user, causing, by the processor, the client device to display a message associated with the memo.

In some embodiments, the method may include analyzing, by the processor, the data identifying the scanned code to determine that the memo has expired. The message associated with the memo may indicate that the memo has expired. In some embodiments, the analyzing of the data identifying the scanned code to determine that the memo has expired may include comparing a time at which the data identifying the scanned code was received with an expiration time for the memo.

In some embodiments, the method may further include advancing, by the processor, a counter in response to receiving the data identifying the scanned code from the client device. The method may include comparing, by the processor, a value of the counter with a maximum view count for the memo to determine that the memo has expired. The message associated with the memo may indicate that the memo has expired.

In some embodiments, the method may further include recording, by the processor, an association of the scanned code with the creating user in a memory. In some embodiments, the determining may include retrieving the association from the memory.

In some embodiments, the method may further include receiving, at the server, data defining the message associated with the memo from the client device permitted to access the private account associated with the creating user. The method may include generating, by the processor, the message according to the data defining the message. The method may include storing, by the processor, the message in a memory. In some embodiments, the method may further include receiving, at the server, data identifying a second requesting user and data identifying the scanned code from a second client device. The method may include analyzing, by the processor, the data identifying the scanned code from the second client device to identify the memo. The method may include determining, by the processor, that the second requesting user is not the creating user by analyzing the data identifying the second requesting user. The method may include retrieving, by the processor, the message from the memory. The method may include causing, by the processor, the second client device to display the message retrieved from the memory.

In another example, a data access system may include a plurality of physical checks each including a unique scannable code, a processor, and a non-transitory memory in communication with the processor. The memory may be configured to store a plurality of associations. Each association may relate one of the unique scannable codes with a user to whom the physical check including the unique scannable code is issued. The memory may be configured to store a plurality of instructions that, when executed by the processor, cause the processor to receive data identifying a requesting user and data identifying one of the unique scannable codes from a client device. The instructions may cause the processor to analyze the data identifying the unique scannable code to identify a memo associated with the unique scannable code, the memo being associated with a creating user. The instructions may cause the processor to determine whether the requesting user is the creating user by comparing the data identifying the requesting user with the association related to the unique scannable code. The instructions may cause the processor to, in response to determining that the requesting user is the creating user, permit the client device to access a private account associated with the creating user. The instructions may cause the processor to, in response to determining that the requesting user is not the creating user, cause the client device to display a message associated with the memo.

In some embodiments, the instructions may further cause the processor to analyze the data identifying the unique scannable code to determine that the memo has expired. The message associated with the memo may indicate that the memo has expired. In some embodiments, the analyzing of the data identifying the unique scannable code to determine that the memo has expired may include comparing a time at which the data identifying the unique scannable code was received with an expiration time for the memo stored in the memory.

In some embodiments, the instructions may further cause the processor to advance a counter in response to receiving the data identifying the unique scannable code from the client device. The instructions may cause the processor to compare a value of the counter with a maximum view count for the memo stored in the memory to determine that the memo has expired. The message associated with the memo may indicate that the memo has expired.

In some embodiments, the instructions may further cause the processor to record the association of the unique scannable code with the creating user in the memory. In some embodiments, the determining may include retrieving the association from the memory.

In some embodiments, the instructions may further cause the processor to receive data defining the message associated with the memo from the client device permitted to access the private account associated with the creating user. The instructions may cause the processor to generate the message according to the data defining the message. The instructions may cause the processor to store the message in the memory. In some embodiments, the instructions may further cause the processor to receive data identifying a second requesting user and data identifying the unique scannable code from a second client device. The instructions may cause the processor to analyze the data identifying the unique scannable code from the second client device to identify the memo. The instructions may cause the processor to determine that the second requesting user is not the creating user by comparing the data identifying the second requesting user with the association related to the unique scannable code. The instructions may cause the processor to retrieve the message from the memory. The instructions may cause the processor to cause the second client device to display the message retrieved from the memory.

In another example, a user device may include an input element configured to receive a user input, a scanning element configured to scan a scannable code, a processor in communication with the input element and the scanning element, and a non-transitory memory in communication with the processor. The memory may be configured to store a plurality of instructions that, when executed by the processor, cause the processor to receive account login data as the user input from the input element. The instructions may cause the processor to receive a scan of the scannable code from the scanning element. The instructions may cause the processor to send at least one message including data identifying a requesting user associated with the account login and data identifying the scannable code. The instructions may cause the processor to receive a response to the at least one message comprising data access instructions. The instructions may cause the processor to process the data access instructions to access a private account in response to the data access instructions being based on an association between the requesting user and the scannable code and access a message associated with the scannable code in response to the data access instructions being based on a lack of the association between the requesting user and the scannable code.

In some embodiments, accessing the private account may include providing a user interface (UI) including functionality that creates the message associated with the scannable code.

In some embodiments, the message may include a digital memo for a physical check.

In some embodiments, the message may include an indication that a digital memo for a physical check has expired.

DETAILED DESCRIPTION OF SEVERAL EMBODIMENTS

Disclosed embodiments may utilize checks with scannable codes in place of or in addition to a memo line. For example, in some embodiments, user devices may be configured to scan checks and generate requests to access memo information. Servers may be configured to respond to the requests, for example by granting access, denying access, and/or granting access to memo creation functionality for some users. Some embodiments may enable enhanced memo functionality, such as providing significantly more data than can be contained on a traditional check memo line (e.g., including long sections of text and/or multimedia elements). Some embodiments may provide enhanced memo security, for example by permitting memo data access to authorized users (e.g., check account holder and/or intended recipient), restricting memo data access to unauthorized users, and/or restricting memo data access to certain times.

Figure 1A:
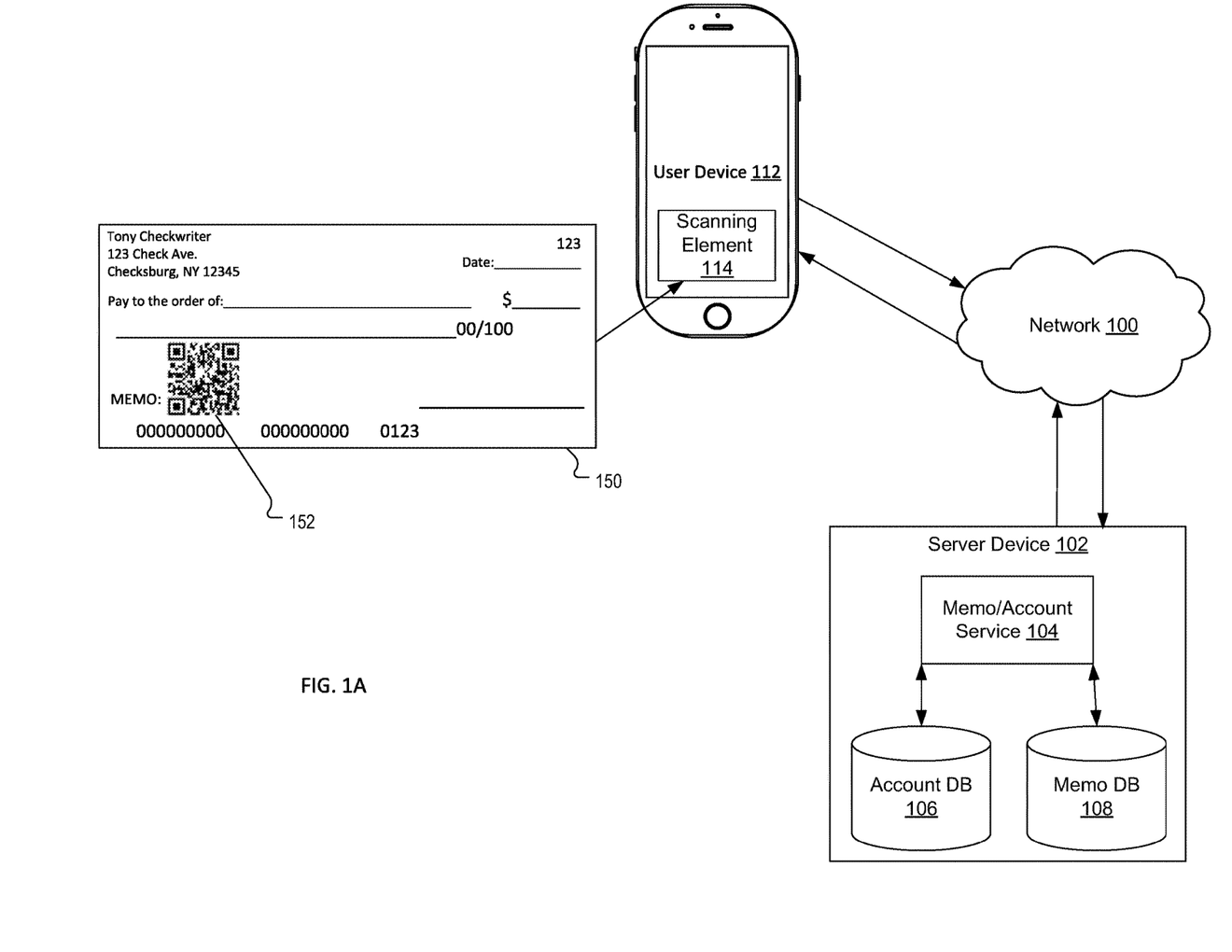
FIGS. 1A-1B show a network according to an embodiment of the present disclosure.
Figure 1B:
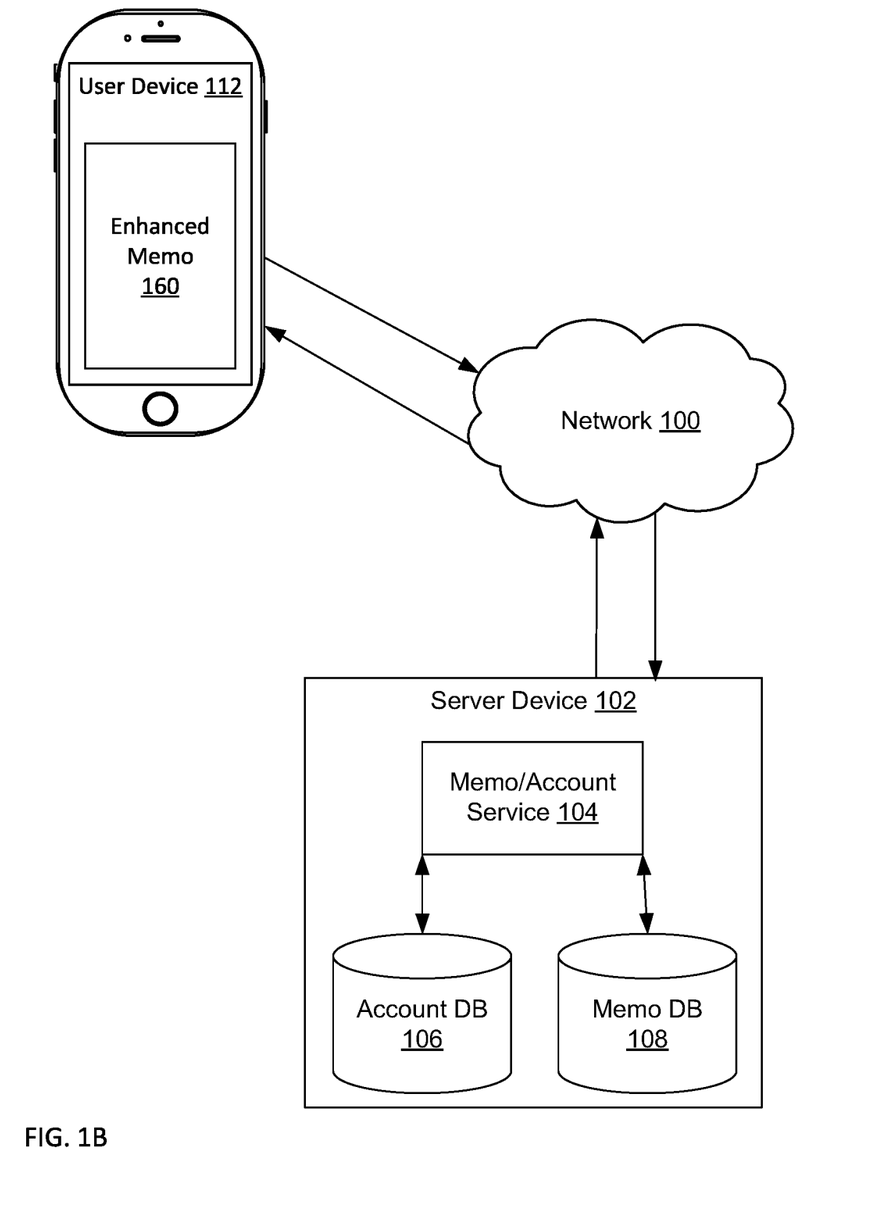

FIGS. 1A-1B show a network 100 according to an embodiment of the present disclosure. Network 100 may include any public and/or private network, such as the Internet. User device 112 and server device 102 may communicate with one another using network 100.

User device 112 may include scanning element 114. For example, scanning element 114 may include a camera or other sensor. User device 112 may be configured to scan codes with scanning element 114. For example, check 150 may have code 152 printed on a surface thereof. In the embodiment illustrated in FIG. 1, code 152 is a QR code, but those of ordinary skill in the art will appreciate that any scannable code may be used (e.g., a bar code, a machine-readable text code, etc.). As described in detail below, user device 112 may use scanning element 114 to scan code 152 and communicate with server device 102 to access data associated with code 152. For example, code 152 may be provided in place of or in addition to a memo line on check 150. By scanning code 152 and communicating with server device 102, a user may view and/or edit a message (e.g., enhanced memo 160) associated with check 150.

A single user device 112 is depicted for ease of illustration, but those of ordinary skill in the art will appreciate that a plurality of user devices 112 configured to scan checks and/or communicate with server device 102 may be present on network 100. Furthermore, user device 112 may be embodied in different forms for different implementations. For example, user device 112 may be embodied as a separate computing device and scanning element 114 in communication with one another.

Server device 102 may be configured to provide access to messages associated with checks 150. For example, server device 102 may include memo/account service 104, which may be configured to process memo access requests from user device 112. Server device 102 may include account database 106, which may be configured to store account data that may be used to determine whether the requesting user has message access and/or message editing privileges. Server device 102 may include memo database 108, which may store messages associated with checks 150. For example, memo database 108 may store enhanced memo 160. If permitted, server device 102 may send enhanced memo 160 data to user device 112, which may display and/or allow editing of enhanced memo 160. Examples of processing that may be performed by memo/account service 104 to facilitate creation of and/or access to messages are described in detail below.

Server device 102 is depicted as a single server including a single memo/account service 104, account database 106, and memo database 108 for ease of illustration, but those of ordinary skill in the art will appreciate that server device 102 may be embodied in different forms for different implementations. For example, server device 102 may include a plurality of servers.

Figure 2:
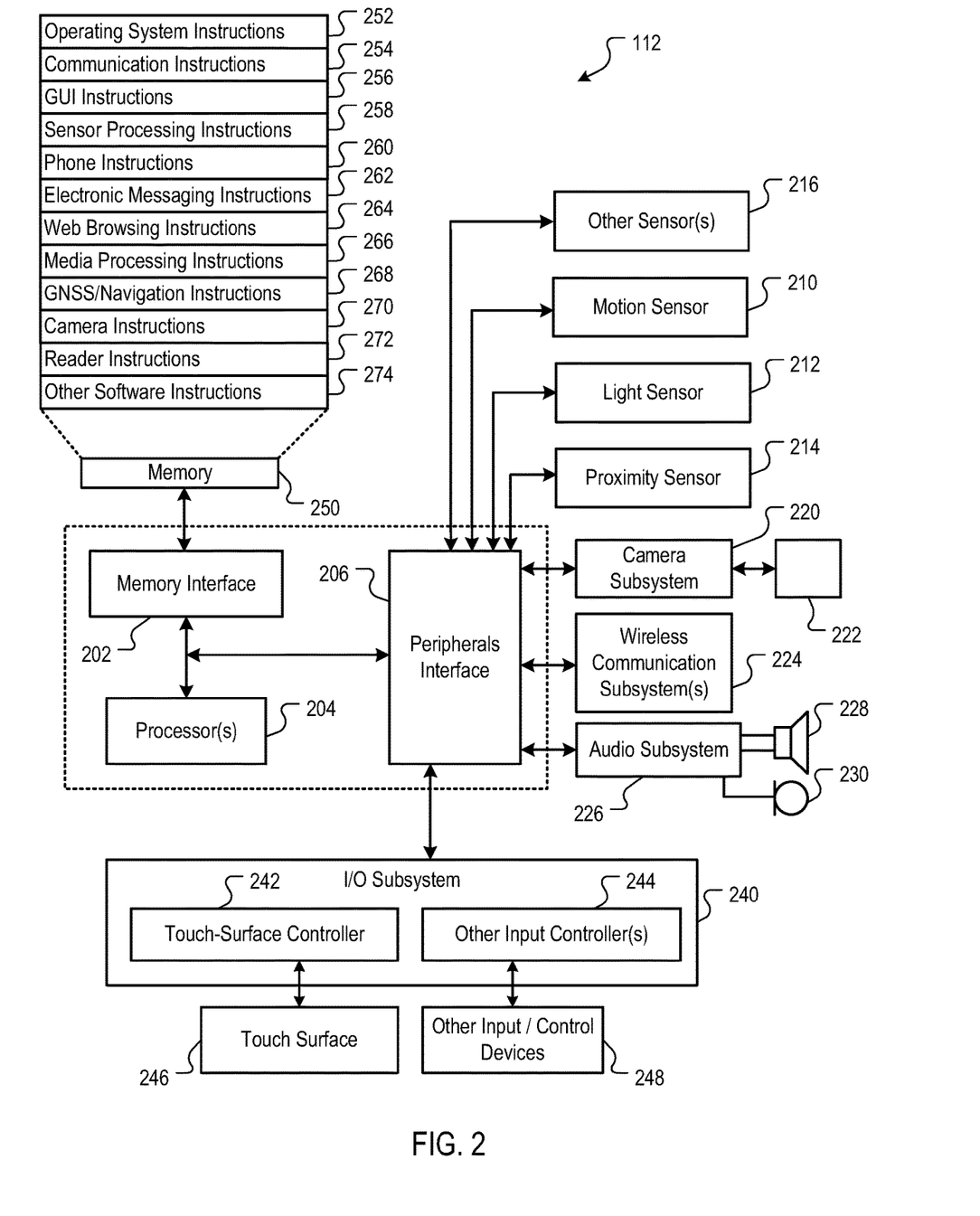
FIG. 2 shows a client device according to an embodiment of the present disclosure.

FIG. 2 shows a client device, such as user device 112, according to an embodiment of the present disclosure. For example, user device 112 may scan memos, create memo data such as messages, and/or access the memo data as described herein. User device 112 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wireless communication subsystems 224, which can include radio frequency receivers and transmitters and/or optical (e.g., infrared) receivers and transmitters. For example, the BTLE and/or WiFi communications described above may be handled by wireless communication subsystems 224. The specific design and implementation of the communication subsystems 224 may depend on the communication network(s) over which user device 112 is intended to operate. For example, user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that user device 112 can be configured as a base station for other wireless devices and/or to provide a WiFi service.

An audio subsystem 226 may be coupled to a speaker 228 and a microphone 530 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, user device 112 may present recorded audio and/or video files, such as MP3, AAC, and MPEG files. In some implementations, user device 112 may include the functionality of an MP3 player, such as an iPod™. User device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store reader instructions 272 to facilitate other processes and functions, such as the memo scanning features described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of user device 112 may be implemented in hardware and/or in software, including in one or more signal processing and/or application specific integrated circuits.

Figure 3:
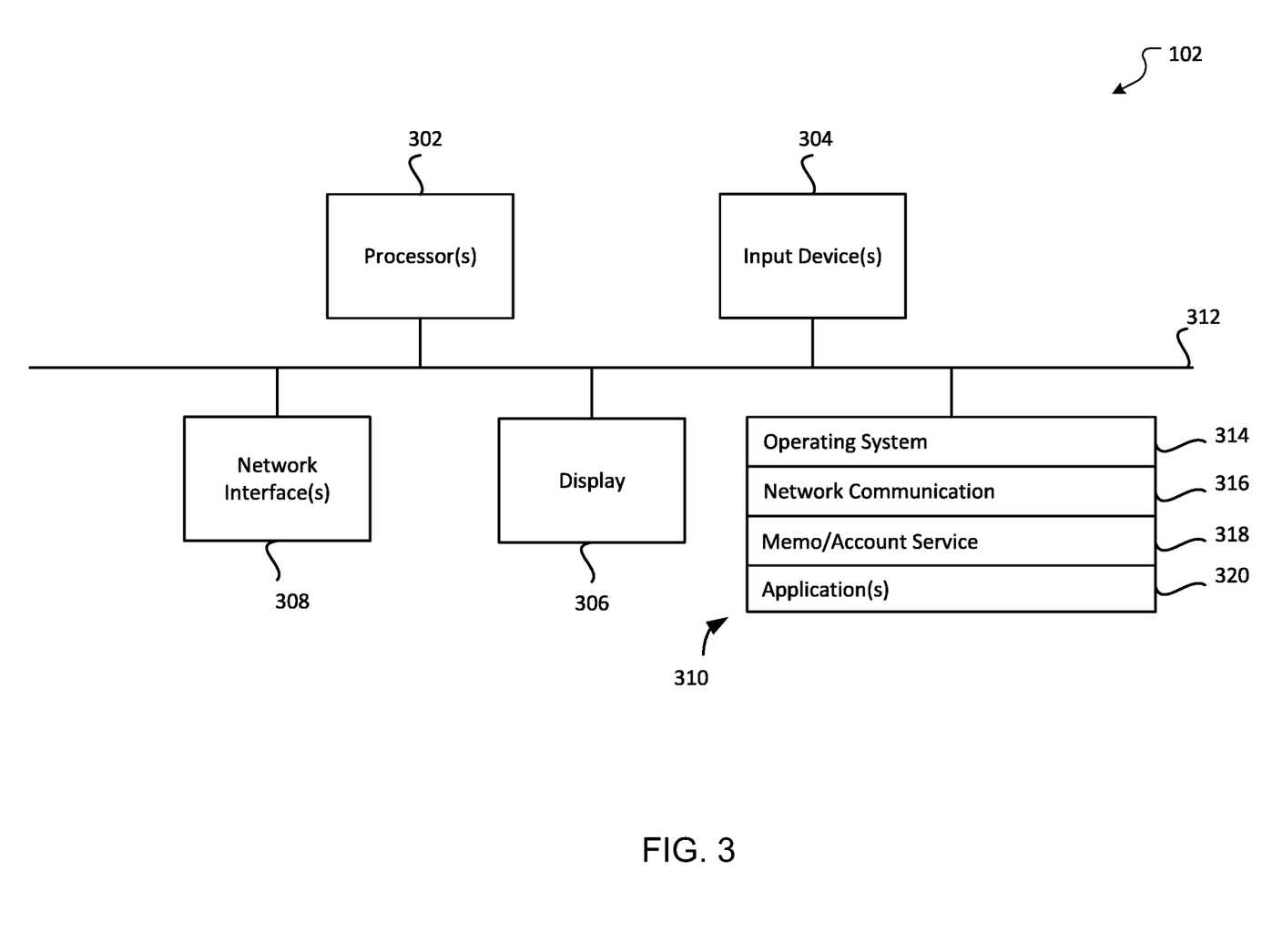
FIG. 3 shows a server device according to an embodiment of the present disclosure.

FIG. 3 is a block diagram of a server device, such as server device 102, according to an embodiment of the present disclosure. Server device 102 may be implemented on any electronic device that runs software applications derived from compiled instructions, including without limitation personal computers, servers, smart phones, media players, electronic tablets, game consoles, email devices, etc. In some implementations, server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Memo/account service instructions 318 may include instructions that create, edit, and/or deliver memo data, such as messages, as described herein. Memo/account service instructions 318 may include instructions that process requests for memo access differently depending on an identity and/or status of the requesting party as described herein. Memo/account service instructions 318 may also perform other processing tasks handled by server device 102 as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
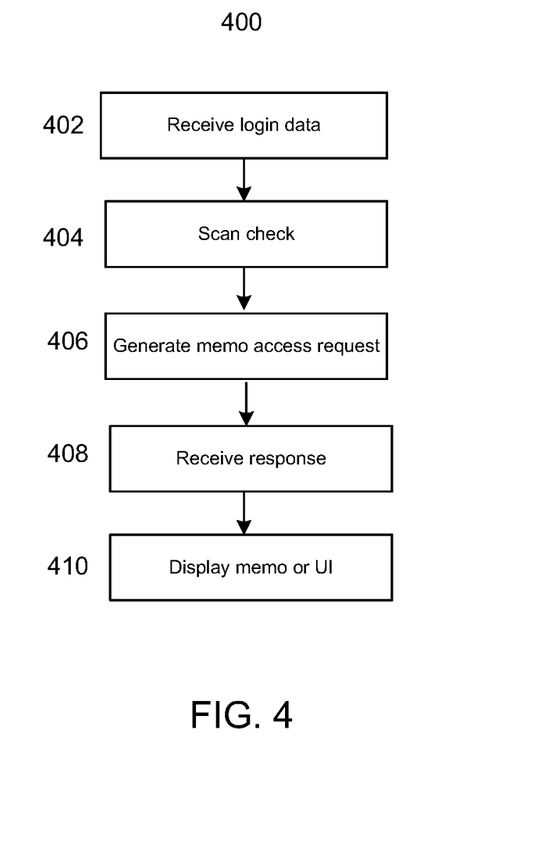
FIG. 4 shows a check scanning and memo display process according to an embodiment of the present disclosure.

FIG. 4 shows a check scanning and memo display process 400 according to an embodiment of the present disclosure. User device 112 may perform process 400 to access enhanced memo 160 in response to scanning code 152, if permitted.

At 402, user device 112 may receive login data. For example, user device 112 may present a UI to a user, allowing the user to login to an account. In some embodiments, the UI may be provided within an app, such as specialized app for scanning checks, for example. In other embodiments, the UI may be provided by a webpage sent from server device 102 or another source. The user may attempt to log into an account. The account may be a checking account and/or may be associated with a checking account. In some embodiments, user device 112 may process the login and allow access to additional functionality (e.g., check scanning and/or account access functionality). In other embodiments, user device 112 may communicate and/or coordinate with server device 102 to process the login.

At 404, user device 112 may scan a check. User device 112 may include scanning element 114, which may sense code 152. For example, scanning element 114 may be a camera. The user may position the camera so that code 152 is imaged by the camera. User device 112 may process the image to detect code 152. Code 152 may be uniquely assigned to a specific check 150. For example, checks 150 may be distinguished by a combination of routing number, account number, and/or check number. Code 152 may be specific to a check number of a specific user account (e.g., indicated by routing and account number).

At 406, user device 112 may generate a memo access request. For example, the memo access request may include data encoded in code 152. In some embodiments, the memo access request may include at least one of the routing number, account number, and check number of check 150 on which scanned code 152 is printed. User device 112 may send the request to server device 102 through network 100.

At 408, user device 112 may receive a response to the request. For example, server device 102 may process the request according to process 500 described below. The response may indicate whether the user is allowed to access enhanced memo 160 associated with code 152 and/or the combination of routing number, account number, and/or check number. For example, the response may indicate that the user is not permitted to access enhanced memo 160, the user is permitted to view enhanced memo 160, or the user is permitted to create and/or edit enhanced memo 160.

At 410, user device 112 may display data, such as a memo message and/or a user interface, in accordance with the response. For example, based on the response received at 408, user device 112 may or may not present a UI for viewing and/or a UI for editing enhanced memo 160. The user may be forbidden from accessing enhanced memo 160 if the user is not a permitted recipient (e.g., a person to whom check 150 is written) and/or if enhanced memo 160 has expired. The user may be permitted to view enhanced memo 160 if the user is a permitted recipient and/or if enhanced memo 160 has not expired. The user may be permitted to create and/or edit enhanced memo 160 if the user is the account holder from which check 150 is drawn.

If the user is permitted to create and/or edit enhanced memo 160, user device 112 may present a UI including settings for editing content of the memo (e.g., entering text, audio, graphics, video, etc.) and/or settings of the memo (e.g., designating permitted recipients and/or expiration times/dates, etc.). User device 112 may send the settings to server device 102, where memo/account service 104 may store enhanced memo 160 in memo database 108 according to the settings.

Figure 5:
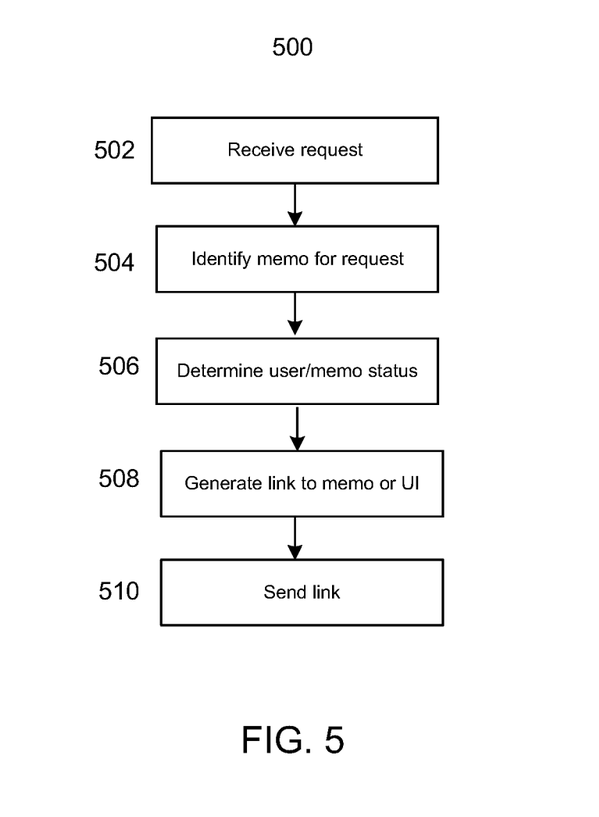
FIG. 5 shows a code evaluation process according to an embodiment of the present disclosure.

FIG. 5 shows a code evaluation process 500 according to an embodiment of the present disclosure. Server device 102 may perform process 500. For example, memo/account service 104 may perform process 500 to evaluate whether to allow access to an enhanced memo 160 in memo database 108 based at least in part on data in account database 106.

At 502, server device 102 may receive a memo access request. The memo access request may have been generated by and sent from user device 112 according to process 400 as described above. For example, the memo access request may include data encoded in code 152. In some embodiments, the memo access request may include at least one of the routing number, account number, and check number of check 150 on which scanned code 152 is printed. Memo/account service 104 may receive the request from user device 112 through network 100.

At 504, server device 102 may identify memo data corresponding to the request. For example, scanned code 152 may identify the specific check 150 on which it is printed and a specific enhanced memo 160 associated with the specific check 150. Memo/account service 104 may check memo database 108 to determine whether the specific enhanced memo 160 has been created. If enhanced memo 160 has not been created, memo database 108 may store only an indication of which account and/or specific check 150 is associated with the specific enhanced memo 160. If enhanced memo 160 has been created, memo database 108 may store message data (e.g., text data, audio data, graphic data, video data, etc.), the identity of one or more recipients permitted to access the message data (e.g., account identifiers and/or names of check 150 recipients), and/or parameters indicating when and/or whether enhanced memo 160 has expired or will expire (e.g., a count of times enhanced memo 160 has been accessed if enhanced memo 160 has an access count limit and/or a time and/or date of expiration for enhanced memo 160).

At 506, server device 102 may determine a status of the user from which the request was received and/or a status of the memo itself (e.g., whether it has been created yet and/or an expiration status). For example, based on the data from memo database 108, memo/account service 104 may determine whether an access count for enhanced memo 160 has been exceeded and/or whether a current date and/or time is past an expiration date and/or time for enhanced memo 160. In some embodiments, memo/account service 104 may check account database 106 and/or memo database 108 to determine whether the user device 112 from which the request was received is associated with an account permitted to access enhanced memo 160 (e.g., an account associated with check 150 holder as indicated by account database 106 or an account indicated as a permitted recipient in memo database 108). In other embodiments, memo/account service 104 may permit access to enhanced memo 160 to any device scanning the check 150 (e.g., assuming any applicable access count or time has not been exceeded).

At 508, server device 102 may generate a response to the request, such as a link to a memo message and/or a UI. If the user is not permitted to access enhanced memo 160 due to identity, expiration, and/or unavailability (e.g., enhanced memo 160 has not been created yet, and the user is not the account holder associated with check 150), memo/account service 104 may generate a response indicating the memo is unavailable. If the user is permitted to access enhanced memo 160 and enhanced memo 160 has been created, memo/account service 104 may generate a response including a link that, when opened on user device 112, may cause user device 112 to display enhanced memo 160 (note that if a counter-based expiration is active, clicking on the link may cause user device 112 to send data to server device 102 causing an advance of the counter for this enhanced memo 160 in memo database 108). If enhanced memo 160 has not been created yet, and the user is the account holder associated with check 150, memo/account service 104 may generate a response including a link that, when opened on user device 112, may cause user device 112 to provide a UI for creating enhanced memo 160. If enhanced memo 160 been created, and the user is the account holder associated with check 150, memo/account service 104 may generate a response including a link that, when opened on user device 112, may cause user device 112 to provide a UI for editing and/or viewing enhanced memo 160. Note that in either case if the user is the account holder, the UI may show additional data such as time and/or access count to expiration, identity of accessing parties, whether check 150 has been cleared, the amount of check 150, other checks available to the account holder (e.g., indicated by check number) and/or memo information for the other checks similar to the memo information for the current check 150, and/or other information.

At 510, server device 102 may send the response. For example, memo/account service 104 may send the response to user device 112 through network 100 using any messaging technology, such as by a text message, an email, a push notification, etc. In some embodiments, memo/account service 104 may also generate and send a message to a device associated with an account holder when user device 112 is associated with a party other than the account holder who is accessing the memo.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of providing data access, the method comprising:
   receiving, at a server, login data identifying a private account from among a plurality of private accounts from a client device;
   processing, by a processor of the server, the login data to log a user into the private account;
   sending, by the processor, data enabling an account app to access the private account to the client device in response to the processing;
   receiving, at the server, data identifying a scanned code from the account app of the client device;
   analyzing, by the processor, the data identifying the scanned code to identify one of the plurality of private accounts to which a check including the scanned code printed thereon was assigned;
   determining, by the processor, whether the private account identified in the login data is the one of the plurality of private accounts to which the check was assigned by analyzing the login data and the scanned code;
   in response to determining that the private account identified in the login data is the one of the plurality of private accounts to which the check was assigned:
      permitting, by the processor, the account app of the client device to access private account functionality associated with the check, the private account functionality including at least memo creation functionality,
      receiving, at the processor, a message from the account app through the memo creation functionality, and
      storing, by the processor, the message as a memo for the check in a memory; and
   in response to determining that the private account identified in the login data is not the one of the plurality of private accounts to which the check was assigned, causing, by the processor, the account app of the client device to display the message associated with the memo without providing access to the private account functionality.

2. The method of claim 1, further comprising:
   analyzing, by the processor, the data identifying the scanned code to determine that the memo has expired, wherein causing the account app of the client device to display the message includes displaying an indication that the memo has expired.

3. The method of claim 2, wherein the analyzing of the data identifying the scanned code to determine that the memo has expired includes comparing a time at which the data identifying the scanned code was received with an expiration time for the memo.

4. The method of claim 1, further comprising:
   advancing, by the processor, a counter in response to receiving the data identifying the scanned code from the client device; and comparing, by the processor, a value of the counter with a maximum view count for the memo to determine that the memo has expired, wherein the message associated with the memo indicates that the memo has expired.

5. The method of claim 1, further comprising:

receiving, at the server, second login data identifying a second private account from among the plurality of private accounts from a second client device;

processing, by the processor, the second login data to log a second user into the second private account;

sending, by the processor, data enabling a second account app to access the second private account to the second client device in response to the processing;

receiving, at the server, second data identifying the scanned code from the second account app of the second client device;

analyzing, by the processor, the data identifying the scanned code from the second client device and the second login data to determine that the second private account identified in the second login data is not the one of the plurality of private accounts to which the check was assigned;

retrieving, by the processor, the message from the memory; and causing, by the processor, the second client device to display the message retrieved from the memory.

6. A data access system, the system comprising:

a plurality of physical checks each including a unique scannable code;

a processor; and a non-transitory memory in communication with the processor, the memory configured to store:

a plurality of associations, each association relating one of the unique scannable codes with a user to whom the physical check including the unique scannable code is issued; and a plurality of instructions that, when executed by the processor, cause the processor to:

receive login data identifying a private account from among a plurality of private accounts from a client device;

process the login data to log a user into the private account;

send data enabling an account app to access the private account to the client device in response to the processing;

receive data identifying one of the unique scannable codes from the account app of the client device;

analyze the data identifying the unique scannable code to identify one of the plurality of private accounts to which a check including the unique scannable code printed thereon was assigned;

determine whether the private account identified in the login data is the one of the plurality of private accounts to which the check was assigned by comparing the login data with the one of the plurality of private accounts to which the check was assigned;

in response to determining that the private account identified in the login data is the one of the plurality of private accounts to which the check was assigned:

permit the account app of the client device to access private account functionality associated with the check, the private account functionality including at least memo creation functionality, receive a message from the account app through the memo creation functionality, and store the message as a memo for the check in the memory; and in response to determining that the private account identified in the login data is not the one of the plurality of private accounts to which the check was assigned, causing, by the processor, the account app of the client device to display the message associated with the memo without providing access to the private account functionality.

7. The system of claim 6, wherein:

the instructions further cause the processor to analyze the data identifying the unique scannable code to determine that the memo has expired; and causing the account app of the client device to display the message includes displaying an indication that the memo has expired.

8. The system of claim 7, wherein the analyzing of the data identifying the unique scannable code to determine that the memo has expired includes comparing a time at which the data identifying the unique scannable code was received with an expiration time for the memo stored in the memory.

9. The system of claim 6, wherein the instructions further cause the processor to:

advance a counter in response to receiving the data identifying the unique scannable code from the client device; and compare a value of the counter with a maximum view count for the memo stored in the memory to determine that the memo has expired, wherein the message associated with the memo indicates that the memo has expired.

10. The system of claim 6, wherein the instructions further cause the processor to:

receive second login data identifying a second private account from among the plurality of private accounts from a second client device;

process the second login data to log a second user into the second private account;

send data enabling a second account app to access the second private account to the second client device in response to the processing;

receive second data identifying the unique scannable code from the second account app of the second client device;

analyze the data identifying the unique scannable code from the second client device and the second login data to determine that the second private account identified in the second login data is not the one of the plurality of private accounts to which the check was assigned;

retrieve the message from the memory; and cause the second client device to display the message retrieved from the memory.

11. A user device comprising:

an input element configured to receive a user input;

a scanning element configured to scan a scannable code;

a processor in communication with the input element and the scanning element; and a non-transitory memory in communication with the processor, the memory configured to store a plurality of instructions that, when executed by the processor, cause the processor to:

receive account login data as the user input from the input element;

receive a scan of the scannable code from the scanning element;

send at least one message including data identifying a requesting user associated with the account login and data identifying the scannable code;

receive a response to the at least one message comprising data access instructions; and process the data access instructions to:

access a private account in response to the data access instructions being based on an association between the requesting user and the scannable code, the private account providing an interface configured to receive a message to be stored as a memo for a check on which the scannable code is provided; and access a message associated with the scannable code in response to the data access instructions being based on a lack of the association between the requesting user and the scannable code.

12. The user device of claim 11, wherein the message comprises a digital memo for a physical check.

13. The user device of claim 11, wherein the message comprises an indication that a digital memo for a physical check has expired.

* * * * *